US012737801B2

(12) United States Patent
Park et al.

(10) Patent No.: US 12,737,801 B2
(45) Date of Patent: Sep. 15, 2026

(54) METHOD, SERVER AND USER TERMINAL FOR PRODUCT RECOMMENDATION

(71) Applicant: KAKAO CORP., Jeju-si (KR)

(72) Inventors: Ji Hye Park, Seongnam-si (KR); Min Seok Kim, Seongnam-si (KR); Min A Kim, Seongnam-si (KR); Won Jun Jang, Seongnam-si (KR); Do Eun Kim, Seongnam-si (KR); Kyu Min Choi, Seongnam-si (KR); Andrew Ho Jun Yang, Seongnam-si (KR); Eun Soo Kim, Seongnam-si (KR); Young Woo Choi, Seongnam-si (KR); Lim Ah Lee, Seongnam-si (KR); Hye Jin Kim, Seongnam-si (KR); Hye Young Kang, Seongnam-si (KR); Soo Yeon Na, Seongnam-si (KR); Hyo Eun Lee, Seongnam-si (KR); Min Seong Kim, Seongnam-si (KR); Jae Heon Kim, Seongnam-si (KR); Min Jeong Kim, Seongnam-si (KR)

(73) Assignee: Kakao Corp., Jeju-si (KR)

( * ) Notice: Subject to any disclaimer, the term of this patent is extended or adjusted under 35 U.S.C. 154(b) by 44 days.

(21) Appl. No.: 18/808,568

(22) Filed: Aug. 19, 2024

(65) Prior Publication Data

US 2025/0078136 A1 Mar. 6, 2025

(30) Foreign Application Priority Data

Sep. 1, 2023 (KR) ........................ 10-2023-0116457

(51) Int. Cl.
*G06Q 30/00* (2023.01)
*G06Q 30/0601* (2023.01)

(52) U.S. Cl.
CPC ................................ *G06Q 30/0631* (2013.01)

(58) Field of Classification Search
CPC ................................................ G06Q 30/06–08
See application file for complete search history.

(56) References Cited

U.S. PATENT DOCUMENTS

2006/0173872 A1* 8/2006 Koike .................... G06Q 30/02
2009/0276284 A1* 11/2009 Yost ....................... G06Q 50/01
705/26.7

(Continued)

FOREIGN PATENT DOCUMENTS

JP 2016-194828 A 11/2016
JP 6928984 B1 9/2021

(Continued)

OTHER PUBLICATIONS

Huang, Bing-Hao et al., "A Weighted Distance Similarity Model to Improve the Accuracy of Collaborative Recommender System", 2015 16th IEEE Int'l Conf. on Mobile Data Management, 978-1-4799-9972-9/15 (Year: 2015).*

(Continued)

*Primary Examiner* — Ethan D Civan
(74) *Attorney, Agent, or Firm* — Knobbe, Martens, Olson & Bear, LLP

(57) ABSTRACT

Proposed is a method for product recommendation by a server. The method may include receiving a gift recommendation request from a first user terminal for a second user, checking available basic information of the second user, and determining a first recommendation information based on the basic information, wherein the first recommendation information comprises a first recommendation reason and at least one product related to the first recommendation reason. The method may also include determining a second recommendation information not based on the basic information, wherein the second recommendation information comprises a second recommendation reason and at least one product related to the second recommendation reason. The method (Continued)

may further include providing recommendation information comprising the first and second recommendation information to the first user terminal. The first recommendation information may be prioritized for display over the second recommendation information.

19 Claims, 11 Drawing Sheets

(56) References Cited

U.S. PATENT DOCUMENTS

| | | | | |
|---|---|---|---|---|
| 2013/0268377 | A1* | 10/2013 | Jessup | G06Q 10/101 705/26.2 |
| 2016/0055571 | A1* | 2/2016 | Wouhaybi | G07C 13/00 705/26.81 |
| 2023/0135032 | A1 | 5/2023 | Johns | |

FOREIGN PATENT DOCUMENTS

| | | | |
|---|---|---|---|
| KR | 10-2015-0027442 | A | 3/2015 |
| KR | 10-2019-0097782 | A | 8/2019 |
| KR | 10-2014773 | B1 | 8/2019 |
| KR | 10-2023-0079704 | A | 6/2023 |

OTHER PUBLICATIONS

Office Action dated Aug. 26, 2025 in Japanese Application No. 2024-136998, in 10 pages.

Office Action dated Jun. 28, 2025 in Korean Patent Application No. 10-2023-0116457 in 19 pages.

* cited by examiner

FIG. 11

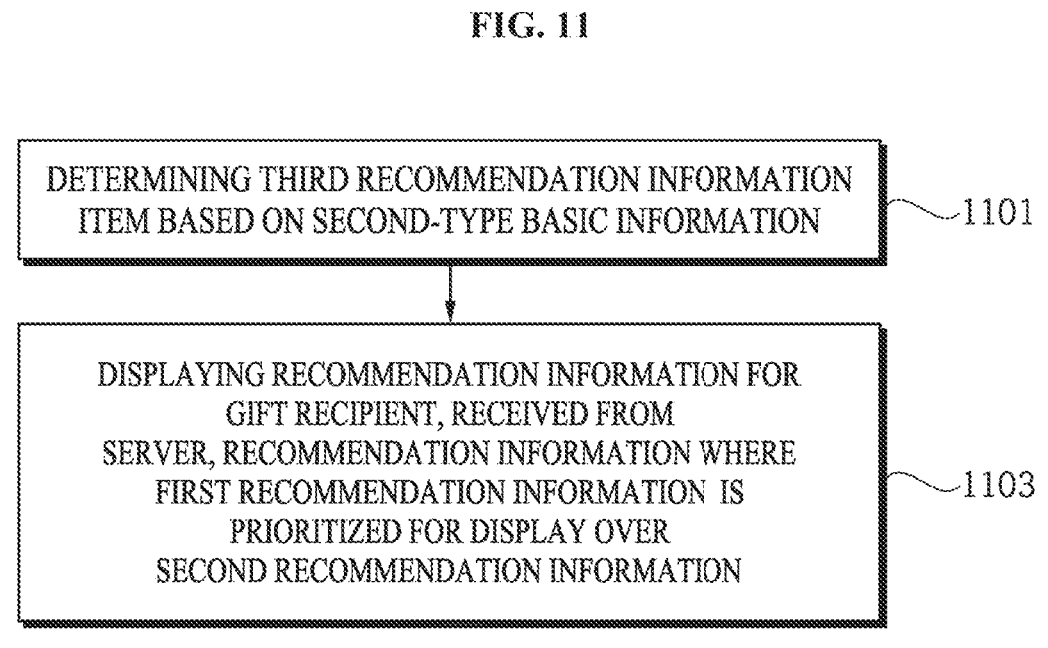

DETERMINING THIRD RECOMMENDATION INFORMATION ITEM BASED ON SECOND-TYPE BASIC INFORMATION ~1101

DISPLAYING RECOMMENDATION INFORMATION FOR GIFT RECIPIENT, RECEIVED FROM SERVER, RECOMMENDATION INFORMATION WHERE FIRST RECOMMENDATION INFORMATION IS PRIORITIZED FOR DISPLAY OVER SECOND RECOMMENDATION INFORMATION ~1103

METHOD, SERVER AND USER TERMINAL FOR PRODUCT RECOMMENDATION

CROSS-REFERENCE TO RELATED APPLICATION

This application claims priority to and the benefit of Korean Patent Application No. 10-2023-0116457 filed on Sep. 1, 2023, the disclosure of which is incorporated herein by reference in its entirety.

BACKGROUND

Technical Field

The present disclosure relates to a method for recommending a customized gift to a gift to a gift sender based on information of a gift recipient.

Description of Related Technology

With the recent proliferation of smart devices and the development of wireless internet technology, people are increasingly making purchases in an online shopping environment rather than offline. In addition, the online shopping environment is not limited by space, and a large number of products and services are available to consumers. However, despite spending significant time in making the right choices, many people still struggle to select the best products during online shopping.

SUMMARY

A method for recommending a product in the present disclosure is not only to suggest popular gifts to a gift sender but also to recommend gifts based on a gift recipient's basic information, thereby providing customized gifts that match the recipient's tastes.

A method for recommending a product in the present disclosure is to allow a gift recipient to directly decide whether to disclose basic information thereof, so that different gifts are recommended to the gift sender based on the recipient's decision.

In one general aspect, there is provided a method for product recommendation by a server, the method including: receiving a gift recommendation request from a first user terminal for a second user; checking available basic information of the second user; determining a first recommendation information based on the basic information, wherein the first recommendation information comprises a first recommendation reason and at least one product related to the first recommendation reason; determining a second recommendation information not based on the basic information, wherein the second recommendation information comprises a second recommendation reason and at least one product related to the second recommendation reason; and providing recommendation information comprising the first and second recommendation information to the first user terminal. Within the recommendation information, the first recommendation information is prioritized for display over the second recommendation information.

The method may further include, prior to receiving the gift recommendation request, receiving information on a permission status for use of the basic information from the second user's terminal.

The permission status for use of the basic information may be set differently depending on a sender comprising a first user.

The basic information may be set differently depending on a sender comprising a first user.

The basic information may include: first-type basic information that requires permission from the second user to use; and second-type basic information that does not require permission from the second user to use.

The first recommendation information may be based on the first-type basic information. The method may further include, prior to providing the recommendation information, determining a third recommendation information based on the second-type basic information, the third recommendation information comprising a third recommendation reason and at least one product related to the third recommendation reason. In providing the recommendation information, the recommendation information may be provided with the third recommendation information included additionally. Within the recommendation information, the first recommendation information may be prioritized for display over the third recommendation information.

The first-type basic information may include at least one of the following: the second user's gender information, age information, birthday information, region information, purchase history information, product viewing information, and information on any gift exchanged with users other than the first user.

The second-type basic information may include at least one of a wishlist set by the second user and information on any gift exchanged between the first user and the second user.

Priorities for displaying individual recommendation information within the recommendation information may be determined based on a number of pieces of basic information on which each of the respective individual recommendation information is based.

The second recommendation reason may be related to at least one of the following: sales information about a product, evaluation information about the product, weather information related to the product, and occasion information related to the product.

When the first and second recommendation information are displayed together within the recommendation information, the first recommendation information is displayed above the second recommendation information.

When the first and second recommendation information are displayed sequentially within the recommendation information, the first recommendation information may be displayed before the second recommendation information.

When there is a plurality of second users, the basic information may include all available basic information of the plurality of second users.

When there is a plurality of second users, the basic information may include only content that is common among information which each of the plurality of second users has allowed to be used.

The method may further include determining priorities for a plurality of products based on the basic information when the plurality of products are included in any one of the first and second recommendation information. Within the recommendation information, the plurality of products may be displayed based on the priorities.

In another aspect, there is provided a server for product recommendation, the server including a memory storing instructions, and a processor configured to execute the instructions to: receive a gift recommendation request from a first user terminal for a second user; check available basic information of the second user; determine a first recommendation information based on the basic information, wherein the first recommendation information comprises a first recommendation reason and at least one product related to the first recommendation reason; and determine a second recommendation information not based on the basic information, the second recommendation information comprising a second recommendation reason and at least one product related to the second recommendation reason; and provide recommendation information comprising the first and second recommendation information to the first user terminal Within the recommendation information, the first recommendation information is prioritized for display over the second recommendation information.

In yet another aspect, there is provided a method for product recommendation by a user terminal, the method including: requesting gift recommendations for a gift recipient from a server; and receiving recommendation information for the gift recipient from the server and displaying the recommendation information. The recommendation information includes: a first recommendation information based on available basic information of the gift recipient, the first recommendation information comprising a first recommendation reason and at least one product related to the first recommendation reason; and a second recommendation information not based on the available basic information, the second recommendation information comprising a second recommendation reason and at least one product related to the second recommendation reason. Within the recommendation information, the first recommendation information is prioritized for display over the second recommendation information.

In yet another aspect, there is provided a user terminal for product recommendation, the user terminal including a memory storing instructions, and a processor configured to execute the instructions to: request gift recommendations for a gift recipient from a server; and receive recommendation information for the gift recipient from a server and display the recommendation information. The recommendation information includes: a first recommendation information based on available basic information of the gift recipient, the first recommendation information comprising a first recommendation reason and at least one product related to the first recommendation reason; and a second recommendation information not based on the available basic information, the second recommendation information comprising a second recommendation reason and at least one product related to the second recommendation reason. Within the recommendation information, the first recommendation information is prioritized for display over the second recommendation information.

BRIEF DESCRIPTION OF THE DRAWINGS

FIG. 11 is a flowchart to explain a method by which a user terminal of the present disclosure displays a gift recommendation function.

DETAILED DESCRIPTION

The process of selecting a gift may be even more complex and challenging than purchasing a product for oneself. When buying for oneself, a person usually has a clear understanding of their own tastes and interests, making it easier to choose a satisfactory product. In contrast, when selecting a gift, it may be difficult to accurately ascertain the recipient's tastes and interests.

Existing general product recommendation systems tend to recommend products based on the general tastes and interests of the broader public. However, such popular recommendations consider the average tastes of a large number of users, failing to reflect the unique tastes and diversity of individual recipients.

As a result, there has been a growing demand to simplify a gift selection process and recommend an optimal gift based on a recipient's tastes and interests, thereby enhancing the recipient's satisfaction.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In addition, in the following description of the embodiments, a detailed description of known functions and configurations incorporated herein will be omitted when it may impede the understanding of the embodiments.

While terms including ordinal numbers, such as "first" and "second," etc., may be used to describe various components, such components are not limited by the above terms. The above terms are used only to distinguish one component from another.

As used herein, the singular forms "a", "an," and "the" are intended to include the plural forms as well, unless the context clearly indicates otherwise.

Each of the steps described above may be performed irrespective of the listed order, except when performed in the listed order due to a special causal relationship.

It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Hereinafter, the present disclosure will be described with reference to the attached drawings.

Figure 1:
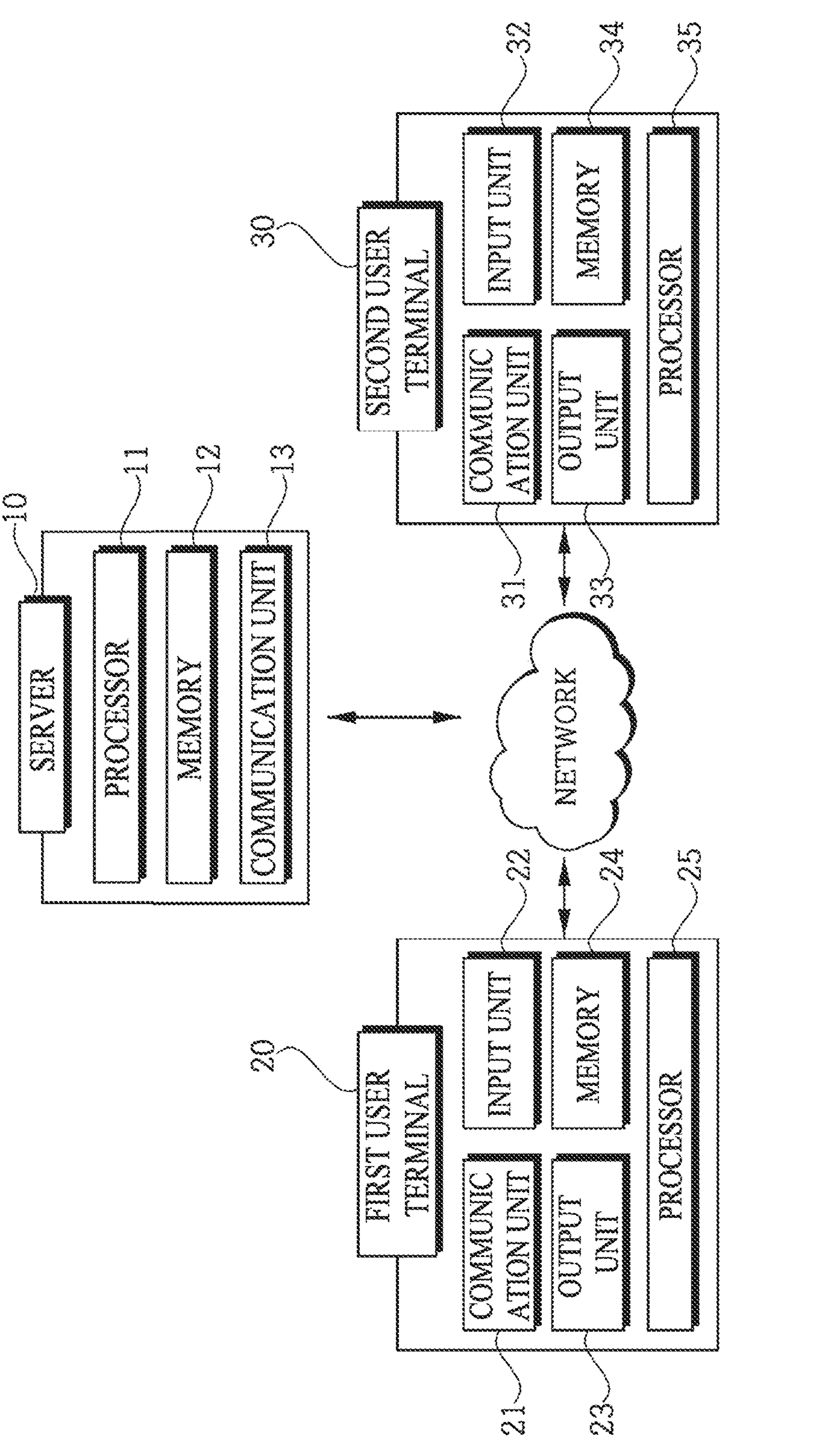
FIG. 1 is a diagram illustrating an example of a network environment according to an embodiment of the present disclosure.

FIG. 1 is a diagram illustrating an example of a network environment according to an embodiment of the present disclosure.

A network environment according to an embodiment of the present disclosure shown in FIG. 1 may include a server 10 and user terminals 20 and 30. The user terminals 20 and 30 may include at least one user terminal 20 or 30 connected to the server 10 over a network.

In FIG. 1, a first user terminal 20 and a second user terminal 30 are shown as exemplary user terminals.

The first user terminal 20 refers to a terminal that a first user logs into with the first user's account registered on the server 10, and the second user terminal 30 refers to a terminal that a second user logs into with the second user's account registered on the server 10.

Hereinafter, for convenience of explanation, the first user terminal 20 will be described as a gift sender's terminal, and the second user terminal 30 will be described as a gift recipient's terminal. However, the present disclosure does not specify or limit functions that may be performed depending on a user terminal.

Communication schemes for a network is not limited. The communication schemes may include not only a communication scheme to utilize a telecommunication network (for example, a mobile communication network, wired Internet, wireless Internet, and a broadcast network), but also a short-range radio communication scheme.

In the present disclosure, the server 10 may be a device capable of transmitting and receiving information through communication with a user terminal over a network. The server 10 may be implemented as a computer device or a plurality of computer devices that provide commands, codes, files, content, services, etc.

The server 10 may include a processor 11, a memory 12, and a communication unit 13.

The processor 11 controls the overall operation of the memory 12 and the communication unit 13 to provide a product recommendation function to the user terminal. The product recommendation function refers to a process where, when a gift sender requests a gift recommendation by specifying a gift recipient, the server 10 provides recommendation information based on the recipient's basic information.

The memory 12 functions as a storage medium and may store a number of application programs running on the server 10, and data and commands for operation of the server 10. In one embodiment, the memory 12 may store an application related to a function of recommending products such as gifts to the user.

The memory 12 may be provided in the form of any of various hardware storage devices such as an ROM, an RAM, a flash drive, a hard drive, etc. or may be provided in the form of web storage.

The communication unit 13 may communicate with a user terminal in a wired/wireless manner over a network.

The server 10 of the present disclosure may provide a gift recommendation function to a user terminal. Hereinafter, it will be described that the server 10 recommends a customized gift for the second user by checking the available basic information of the second user on the first user terminal 20.

The server 10 may receive a gift recommendation request from a first user terminal 20 for a second user, check available basic information of the second user, and determine a first recommendation information, which is based on the basic information, and a second recommendation information, which is not based on the basic information. Here, the first recommendation information may include at least one product related to a first recommendation reason and the first recommendation reason itself, while the second recommendation information may include at least one product related to the second recommendation reason and the second recommendation reason itself. The server 10 may provide the first user terminal 20 with recommendation information including the first and second recommendation information. In the recommendation information, the first recommendation information may be prioritized for display over the second recommendation information.

Here, the available basic information refers to information related to the second user that the server 10 can use to recommend a gift to the second user who is a gift recipient. For example, the basic information may include at least one of the following: the second user's gender information, age information, birthday information, region information, purchase history information, product viewing information, information exchanged with other users who are not the first user, wishlist, and information on any gift exchanged with the first user.

The basic information may include first-type basic information and second-type basic information. Here, the first-type basic information refers to information that the server 10 can use for the gift recommendation function only if the server 10 has obtained separate permission from the second user. The first-type basic information may be defined in various ways according to policies set by the server 10. For example, the first-type basic information may include at least one of the following: the second user's gender information, age information, birthday information, region information, purchase history information, product viewing information, and information exchanged with other users who are not the first user. This first-type basic information may be set as not usable for the gift recommendation function if separate permission from the second user is not obtained.

The second-type basic information refers to information that the server 10 may use for the gift recommendation function without obtaining separate permission from the second user. The second-type basic information may include information for which the second user has been previously approved for use, such as through terms and conditions, or information that has already been disclosed to the first user. For example, the information on any gift exchanged between the first user and the second user may correspond to the second-type basic information because the gift information is naturally disclosed to the first user.

In addition, as for the second-type basic information, inputting the corresponding basic information by the second user itself may imply permission to use the corresponding basic information for the gift recommendation function. For example, if the second user inputs a wishlist of products, hoping to receive from others, this may imply permission to use the wishlist information for the gift recommendation function.

Here, each of the first and second recommendation information includes a recommendation reason and a recommended product. The recommended product may include at least one product related to the recommendation reason. When recommendation information is displayed on a user terminal, the recommendation reason and the recommended product may be displayed together and association with each other.

The user terminals 20 and 30 include the first user terminal 20 for the gift sender and the second user terminal 30 for the gift recipient.

The user terminals 20 and 30 may include communication units 21 and 31, input units 22 and 32, output units 23 and 33, memories 24 and 34, and processors 25 and 35.

The communication units 21 and 31 may communicate with the server 10 or other terminals in a wired or wireless manner.

The input units 22 and 32 may receive various information through a user's operation and input. The input units 22 and 32 may be touch screen modules, keyboards, mouses, buttons, cameras, styluses, microphones, etc.

The user terminals 20 and 30 may receive a user interaction through the input units 22 and 32. The interaction refers to the user's operating an input unit to enter information reflecting the user's selection or intention into a user terminal. For example, the interaction may include touching on a touchscreen, clicking with a mouse, typing on a keyboard, providing voice input through a microphone, capturing an image using a camera, recognizing movements through a motion sensor, and the like.

The output units 23 and 33 may output various information. The output units 23 and 33 may be display devices, speakers, vibration generators, tactile generators, etc. In some cases, the output units 23 and 33 may be devices (e.g., Bluetooth earphone) respectively connected to the user terminals 20 and 30 through wired or wireless communication (e.g., short-range radio communication such as Bluetooth) to receive and output signals.

Each of the memories 24 and 34 functions as a storage medium and may store a plurality of application programs serve as running on a corresponding one of the user terminal 20 and 30 and data and instructions for operating the corresponding one of the user terminal 20 and 30. Each of the memories 24 and 34 may be provided in the form of any of various hardware storage devices such as an ROM, an RAM, a flash drive, a hard drive, etc. or may be provided in the form of web storage.

In one embodiment, an application for providing a product recommendation service may be stored in the memories 24 and 34.

The processors 25 and 35 control the overall operation of the communication units 21 and 31, input units 22 and 32, output units 23 and 33, and memories 24 and 34 to run the application related to the product recommendation services.

The first user terminal 20 may request gift recommendations for the second user, who is the gift recipient, from the server and receive and display recommendation information about the second user from the server. Here, the recommendation information may include the first recommendation information and the second recommendation information. In the recommendation information, the first recommendation information may be prioritized for display over the second recommendation information.

The second user terminal 30 may decide whether to allow the server 10 to use basic information thereof for the gift recommendation function. The second user terminal 30 may provide information on a permission status for the use of the basic information to the server. The second user terminal may set the permission status for the use of the basic information differently depending on the sender, including the first user. In some cases, the second user terminal may also set the basic information itself differently depending on the sender, including the first user.

Hereinafter, an embodiment of a method for providing a gift recommendation function by the server 10 of the present disclosure will be described.

Figure 2:
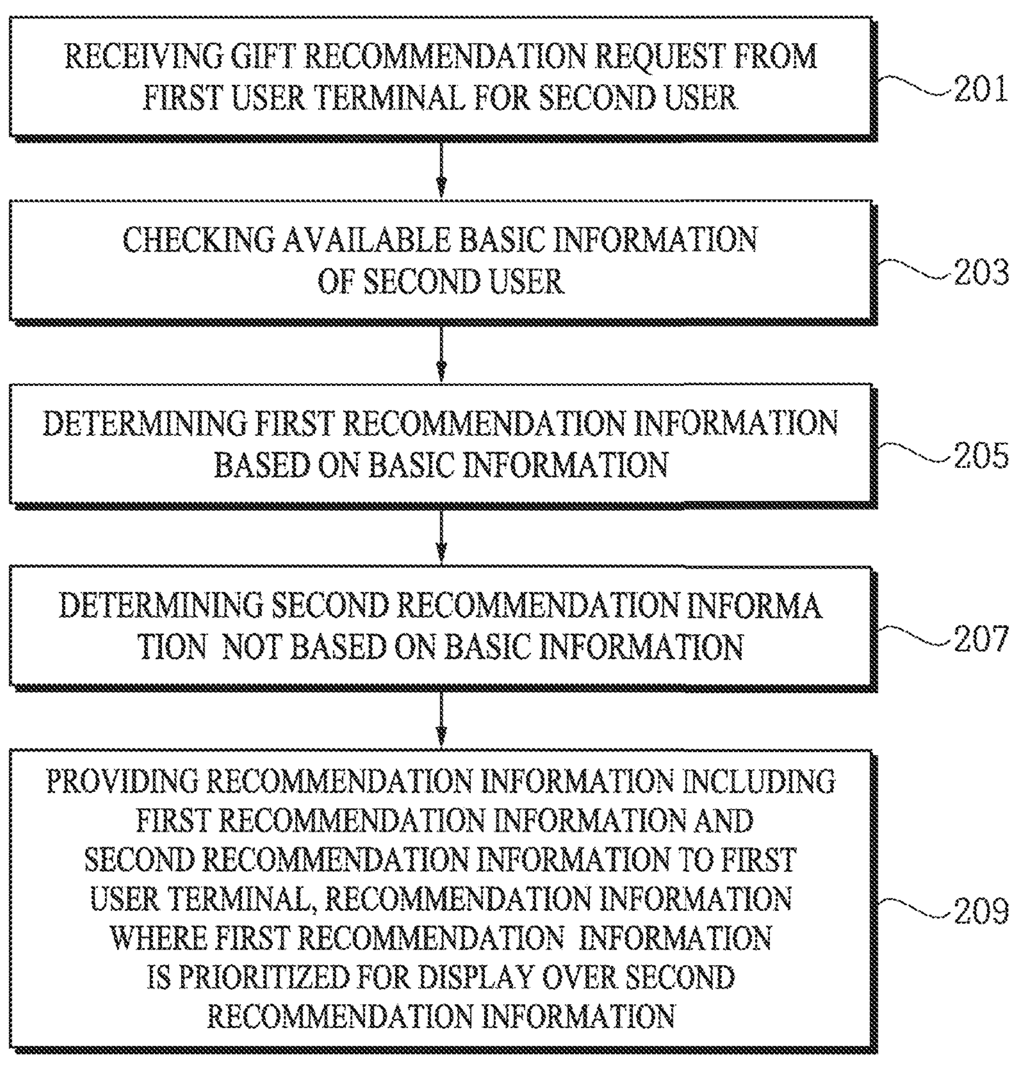
FIG. 2 is a flowchart to explain how a server of the present disclosure provides a gift recommendation function.

FIG. 2 is a flowchart to explain a method for providing a gift recommendation function by the server 10 of the present disclosure.

In operation 201, the server 10 receives a gift recommendation request from a first user terminal 20 for a second user.

The server 10 may provide a gift recommendation interface within a product recommendation page to the first user terminal 20. In response to an interaction with the gift recommendation interface from the first user terminal 20, the server 10 may receive a gift recommendation request.

The first user terminal 20 may select the second user from a friend list registered in a social media service provided by the server 10 and request gift recommendations for the second user. In some cases, the first user terminal 20 may also provide additional information related to the gift recommendation. The additional information may include, for example, a price range, type, and occasion related to the gift.

In operation 203, the server 10 checks available basic information of the second user.

The server 10 may check the available basic information of the second user for the gift recommendation function on the first user terminal 20. Here, the available basic information refers to information related to the second user that the server 10 may use to recommend gifts for the second user.

For example, the basic information may include the second user's gender information, age information, birthday information, location information, purchase history information, product viewing information, information exchanged with users other than the first user, wishlist, and information on any gift exchanged with the first user.

The second user terminal 30 may preset basic information available to the server 10 for the gift recommendation function through an interface regarding whether to allow the use of the basic information.

Specifically, the server 10 may receive an interaction with the interface regarding whether to allow the use of the basic information from the second user terminal 30. Upon receiving the interaction from the second user terminal 30, the server 10 may check a permission status for the use of the basic information of the second user.

The interface regarding whether to allow the use of the basic information may include first-type basic information and second-type basic information. Here, the first-type basic information refers to information among the basic information that is available only if the server 10 has obtained separate permission from a recipient for the gift recommendation function.

The first-type basic information may be defined in various ways according to policies set by the server 10. For example, the first-type basic information may include gender information, age information, birthday information, location information, purchase history information, product viewing information, and information exchanged with users other than the first user.

The second-type basic information refers to information among the basic information that the server 10 may use for the gift recommendation function without obtaining separate permission from the second user. The second-type basic information may include information for which the second user has been previously approved for use, such as through terms and conditions, or information that has already been disclosed to the first user. For example, the information on any gift exchanged between the first user and the second user may correspond to the second-type basic information because the gift information is naturally disclosed to the first user.

In addition, as for the second-type basic information, inputting the corresponding basic information by the second user itself may imply permission to use the corresponding basic information for the gift recommendation function. For example, if the second user inputs a wishlist of products, hoping to receive from others, this may imply permission to use the wishlist information for the gift recommendation function.

The server 10 may receive information on a permission status for the use of the basic information differently depending on a sender from the second user terminal 30. For example, the second user may set a permission status for the use of the basic information differently based on whether the sender is the first user, who is a family member or a customer. Specifically, if the first user is a family member of the second user, the second user may set the permission status to allow the use of birthday information among the basic information. However, if the first user is a customer of the second user, the second user may set the permission status not to allow the use of birthday information.

Depending on the sender, the server 10 may receive a different setting of the basic information from the second user terminal 30. For example, the second user may set the basic information differently based on whether the first user is a family member or a customer. For example, if the first user is a family member of the second user, the second user may set a preferred gift price range in the basic information to KRW 100,000 to 200,000. However, if the first user is a customer of the second user, the second user may set a preferred gift price range in the basic information to KRW 10,000 or less.

The second user may categorize a friend list registered with a social media service, provided by server 10, into groups and differently set a permission status for the use of basic information or apply different content of each group.

In operation 205, the server 10 determines first recommendation information based on the basic information.

The server 10 may determine the first recommendation information based on the available basic information of the second user. Here, the first recommendation information includes a recommendation reason based on the available basic information set by the gift recipient, and information on a recommended product related to the recommendation reason.

The first recommendation information may include a first recommendation reason, at least one product information related to the first recommendation reason, price information of a product, information about reviews of the product, and information about the recipient.

Here, the first recommendation reason refers to the recommendation reason based on the available basic information set by the gift recipient. The server 10 may determine different recommendations reason based on whether the use of the first-type basic information is allowed by the second user terminal 30.

For example, the server 10 may check a permission setting for product viewing information of the second user terminal 30. In this case, the server 10 may determine a recommendation reason related to the product viewing information of the second user.

In operation 207, the server 10 determines second recommendation information that is not based on the basic information.

The server 10 may determine the second recommendation information that is not based on the available basic information of the second user. Here, the second recommendation information includes a recommendation reason not based on available basic information set by a gift recipient, and a recommended product related to the recommendation reason.

The second recommendation information may include the second recommendation reason, at least one product information related to the second recommendation reason, price information of a product, information about reviews of the product, and information about the recipient.

Here, the second recommendation reason refers to a recommendation reason for a popular or generally popular product not based on the recipient's available basic information. For example, the second recommendation reason may include at least one of sales information about the product, evaluation information about the product, weather information related to the product, and occasion information related to the product.

In operation 209, the server 10 provides recommendation information including the first and second recommendation information to the first user terminal 20.

Upon receiving an interaction with a gift recommendation interface from the first user terminal 20, the server 10 may provide gift recommendation information to the first user terminal 20. The gift recommendation information may include first recommendation information, which is based on the available basic information of the second user, and second recommendation information, which is not based on the available basic information of the second user. In one embodiment, the recommendation information may display the first and second recommendation information together. In another embodiment, the recommendation information may display the first and second recommendation information sequentially.

In the recommendation information, the first user terminal 20 may display the first recommendation information with priority over the second recommendation information.

As an example of displaying the first recommendation information with priority over the second recommendation information, the first user terminal 20 may display the first recommendation information above the second recommendation information when displaying the both information together.

As another example of displaying the first recommendation information with priority over the second recommendation information, the first user terminal 20 may display the first recommendation information before the second recommendation information when displaying the respective recommendation information sequentially on the screen.

Hereinafter, an example of a method in which the server 10 described with reference to FIG. 2 provides a gift recommendation function will be described with reference to FIGS. 3 to 6.

FIGS. 3 to 6 exemplarily show screens in the process of performing a method of providing a gift recommendation function by the first user terminal 20 or the second user terminal 30 according to embodiments of the present disclosure.

Figure 3:
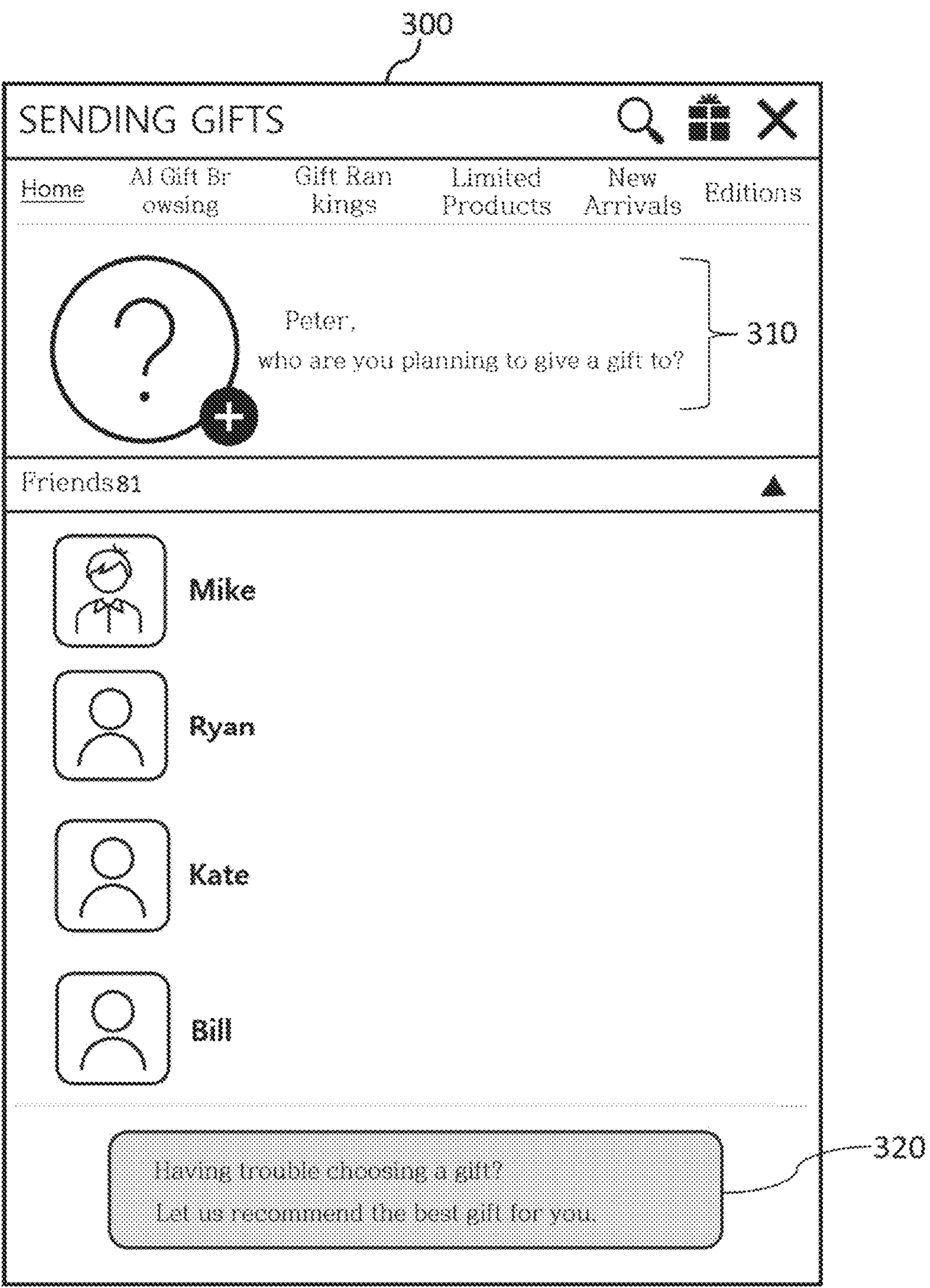
FIGS. 3 to 6 show exemplary screens of a first user terminal or a second user terminal in the process of performing a method of providing a gift recommendation function, according to embodiments of the present disclosure.

FIG. 3 illustrates a screen where the first user terminal 20 provides a gift recommendation interface for the server 10 to perform operation 201 of FIG. 2.

Referring to FIG. 3, the first user terminal 20 may display a gift recommendation screen 300 for a gift request. The gift recommendation screen 300 may include a recipient selection interface 310 and a gift recommendation interface 320.

Referring to FIG. 3, the first user terminal 20 provides a recipient selection interface 310 through which information about the second user may be input. The first user terminal 20 may input information on the second user through the recipient selection interface 310. In some cases, the first user terminal 20 may input information on a plurality of recipients.

In addition, the first user terminal 20 may use the gift recommendation function through the gift recommendation interface 320. When receiving an interaction with the gift recommendation interface 320 from the first user terminal 20, the server 10 may provide recommendation information including first and second recommendation information to the first user terminal 20.

Figure 4:
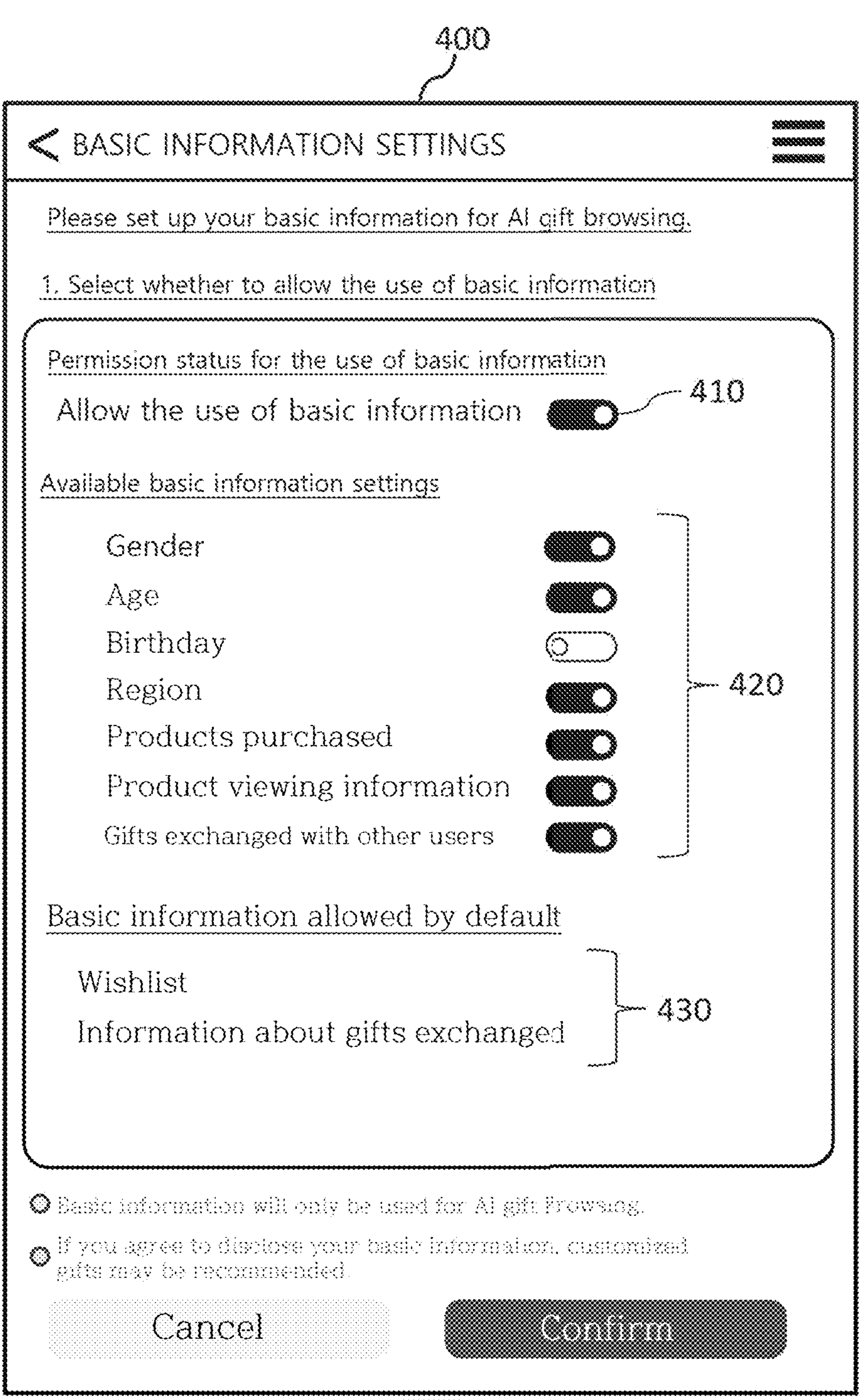

FIG. 4 illustrates a screen where a second user terminal 30 displays an interface regarding whether to allow the use of basic information in order for the server 10 to perform operation 203 of FIG. 2.

Referring to FIG. 4, the second user terminal 30 may display an interface 400 regarding whether to allow the use of the basic information. The interface 400 regarding whether to allow the use of the basic information may include a permission interface 410, a first-type basic information permission interface 420, and a second-type basic information permission interface 430.

The second user terminal 30 may select whether to allow the use of the basic information through the Allow interface 410. Specifically, referring to FIG. 4, the second user terminal 30 may have allowed the use of the basic information. In response to an interaction with the permission interface 410, the second user terminal 30 may change the permission status for the use of the basic information to 'disallowed.' Conversely, the second user terminal 30 may change the permission status for the use of the basic information from 'disallowed' to 'allowed' in response to an interaction with Allow interface 410.

Here, the first-type basic information 420 refers to information that the server 10 can use among the basic information for the gift recommendation function only if the server 10 has obtained separate permission from a recipient.

The second user terminal 30 may select whether to allow the use of the first-type basic information through the first-type basic information permission interface 420. Specifically, in response to an interaction with each piece of the first-type basic information, the second user terminal 30 may change the permission status to use a corresponding piece of the first-type basic information.

The first-type basic information may include gender information, age information, birthday information, region information, purchase history information, product viewing information, and information exchanged with users other than the first user.

Here, the second-type basic information 430 refers to information that the server 10 can use among the basic information for the gift recommendation function without obtaining separate permission from the recipient. The second-type basic information 430 may include a wishlist and information on any gift exchanged with the first user.

In one embodiment, the server 10 may receive a gift recommendation request from the first user terminal 20 for a plurality of recipients. In this case, the basic information may include all available basic information on a plurality of second users.

In another embodiment, the basic information may include only content that is common among information which each of the plurality of second users has allowed to be used (i.e., information input or set as basic information).

For example, one of the two second users may set "gender: male" and "region: Seoul" as available information, while the other may set "gender: male" and "region: Daejeon" as available information. In this example, "gender" in the two user's available basic information has the same content as "male." In this case, the basic information may include "gender: male." Thereafter, the server 10 may recommend men's clothing or men's cosmetics as products of the first recommendation information based on the basic information.

As in the above example, such as gender or region in the basic information have limited selectable options, so it is relatively common for users to have the same content in these. However, such as age, purchased products, and product viewing information in the basic information have various selectable options, so it is difficult for users to have the same content in these. In a such case, the server 10 may categorize the content of each of the basic information and consider information in the same category as having the same content.

For example, one of two second users may set "age: 34," "purchased product: cake voucher" as available information, while the other may set "age: 37," "purchased product: coffee coupon" as available information. In this example, the server 10 may categorize the "age" in the two second user's basic information as a category of "30s" instead of the specific ages (i.e., 34 and 37), and add the two second user's age information to the basic information. In addition, the server 10 may categorize the "purchased products" in the two second user's basic information as a category of "food and beverage" instead of specific product information (i.e., cake voucher and coffee coupon), and add the two second user's purchased product information to the basic information.

Furthermore, while gender, age, birthday, and region in the basic information are each set as single piece of information, purchased products and product viewing information may be each set as multiple pieces of information because a user can purchase or view a plurality of products. In this way, when each user's basic information includes a plurality of information, the same content among the plurality of information may be included as basic information.

For example, one of the two second users may set "product viewing information: shoes, hats, cake voucher" as available information, while the other may set "product browsing information: hats, T-shirts" as available information. In this example, "hats" is common in the product viewing information of the two second user's basic information, so "product viewing information: hats" may be added to the basic information.

Although not shown in the drawings, the second user may set a permission status to use the basic information differently depending on the sender. For example, the second user terminal 30 may set a permission status to use the basic information differently depending on whether the first user is a parent or a teacher. Specifically, if the first user is a parent, the second user may allow the use of birthday information among the basic information. However, if the first user is a teacher, the second user may disallow the use of birthday information among the basic information.

The second user may set different content to be displayed in the basic information depending on the sender. For example, the second user may set different content of the basic information depending on whether the first user is a parent or a teacher. Specifically, if the first user is a parent, the second user may set the content of a wishlist among the basic information to "computer." However, if the first user is a teacher, the second user may set the content of the wishlist among the basic information to "cake."

Figure 5:
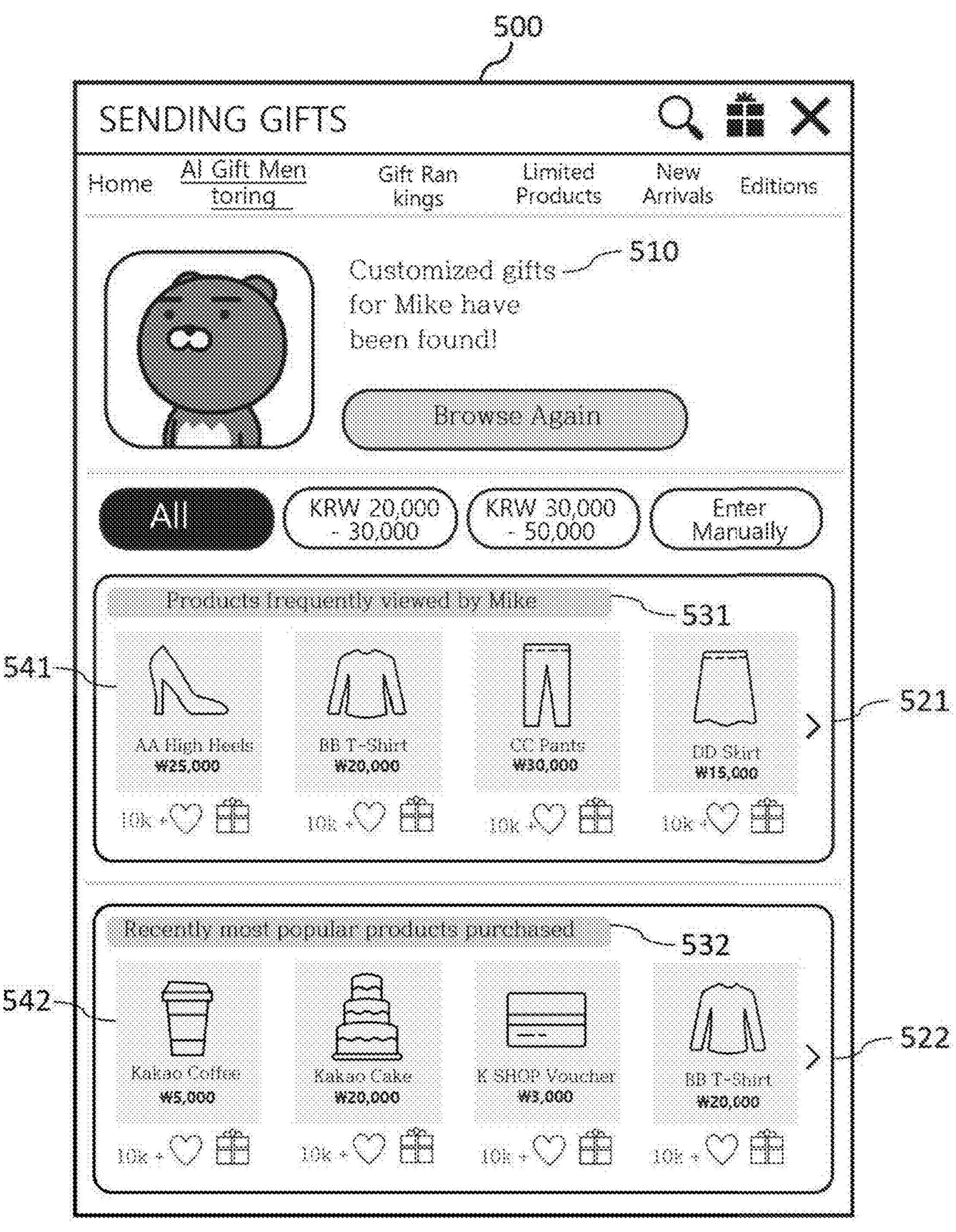

FIG. 5 illustrates a screen where the first user terminal 20 displays recommendation information 500, including a first recommendation information 521 and a second recommendation information 522, in order for the server 10 to perform operations 205, 207, and 209 of FIG. 2.

Referring to FIG. 5, the first user terminal 20 may display the recommendation information 500.

The recommendation information 500 may include information 510 about a recipient, the first recommendation information 521, and the second recommendation information 522. The first recommendation information 521 may include a first recommendation reason 531 and at least one product 541 related to the first recommendation reason. The second recommendation information 522 may include a second recommendation reason 532 and at least one product 542 related to the second recommendation reason.

Referring to FIG. 5, in the information 510 about the recipient, the first user terminal 20 may display the recipient's profile, information about the recipient's name, and information about customized gift recommendations.

For example, in the information 510 about the recipient, the first user terminal 20 may display the recipient's profile, the recipient's name (e.g., Mike), and an indication that customized gift recommendations are being made for the recipient (e.g., "Customized gifts for Mike have been found!").

The first user terminal 20 may display the first recommendation information 521 within the recommendation information 500. The first user terminal 20 may display the first recommendation reason 531 and at least one product 541 related to the first recommendation reason in the first recommendation information 521.

Here, the first recommendation reason, 531, refers to a recipient-specific recommendation reason determined based on the recipient's available basic information by the server 10. Server 10 may determine different recommendation reasons based on whether the use of the first-type basic information is allowed by the second user terminal 30.

For example, the server 10 may check a permission setting for product viewing information of the second user terminal 30. In this case, the server 10 may determine a recommendation reason related to the product viewing information of the second user.

The first user terminal 20 may display the second recommendation information 522 within the recommendation information 500. The first user terminal 20 may display the second recommendation reason 532 and at least one product 542 related to the second recommendation reason in the second recommendation information 522.

Here, the second recommendation reason 532 refers to a recommendation reason for generally popular products that are not based on the recipient's available basic information. For example, the second recommendation reason 532 may include at least one of the following: sales information of a product, evaluation information of the product, weather information related to the product, and occasion information related to the product.

The first user terminal 20 may display the first recommendation information 521 and the second recommendation information 522 together. In this case, the first user terminal 20 may display the first recommendation information 521 above the second recommendation information 522.

For example, the first user terminal 20 may display the first recommendation information 521, which includes the first recommendation reason 531 (e.g., "Products frequently viewed by Mike."), above the second recommendation information 522, which includes the second recommendation reason 532 (e.g., "Recently most popular products purchased.").

Figure 6:
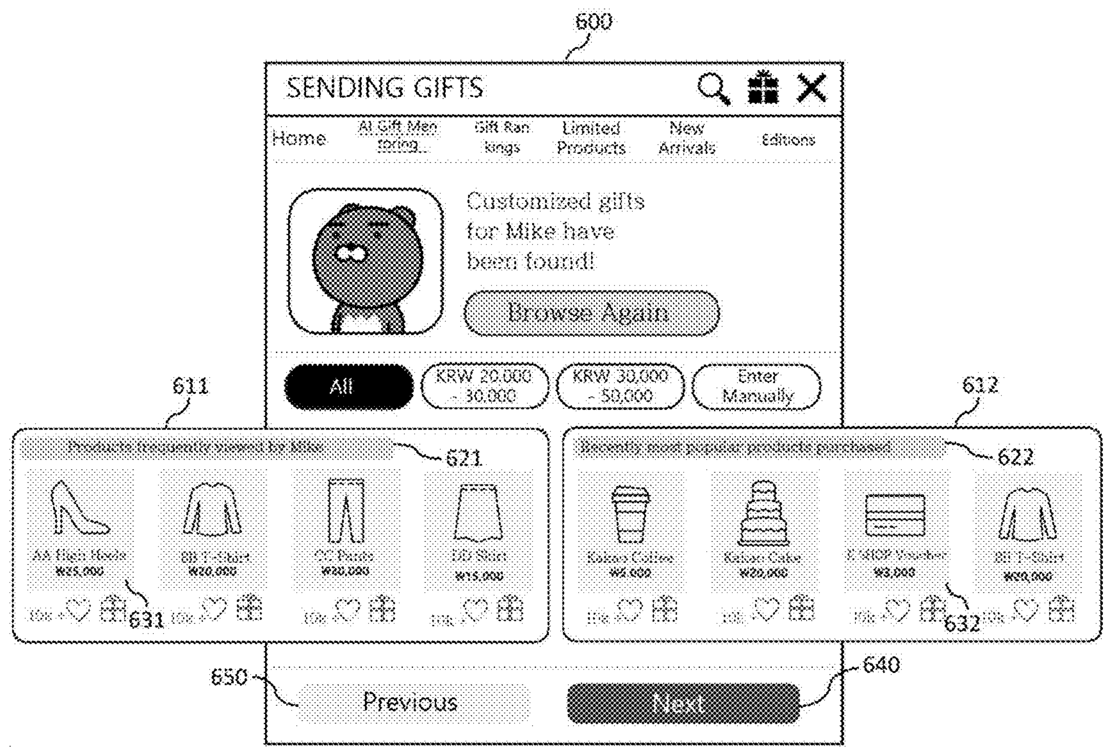

FIG. 6 illustrates a screen where the first user terminal 20 sequentially displays recommendation information 600 including a first recommendation information 611 and a second recommendation information 612 in order for the server 10 to perform operation 209 of FIG. 2.

Referring to FIG. 6, the first user terminal 20 may display the recommendation information 600.

The recommendation information 600 may include information about a recipient, the first recommendation information 611, and the second recommendation information 612. The first recommendation information 611 may include a first recommendation reason 621 and at least one product 631 related to the first recommendation reason 621. The second recommendation information 612 may include a second recommendation reason 622 and at least one product 632 related to the second recommendation reason 622.

The first user terminal 20 may display the first recommendation information 621 and the second recommendation information 622 sequentially. In this case, the first user terminal 20 may display the first recommendation information 621 before the second recommendation information 622.

For example, the first user terminal 20 may display the first recommendation information 611, which includes the first recommendation reason 621 (e.g., "Products frequently viewed by Mike"), before the second recommendation information 612, which includes the second recommendation reason 622 (e.g., "Recently most popular products purchased").

The first user terminal 20 may display the second recommendation information 612 in response to an interaction with Next interface 640 on the screen where the first recommendation information 611 is displayed. In addition, in response to a left drag interaction while the first recommendation information 611 is displayed, the first user terminal 20 may display the second recommendation information 612.

Conversely, in response to an interaction with Previous interface 650 while the second recommendation information 612 is displayed, the first user terminal 20 may display the first recommendation information 611. In addition, in response to a right drag interaction while the second recommendation information 612 is displayed, the first user terminal 20 may display the first recommendation information 611.

Figure 7:
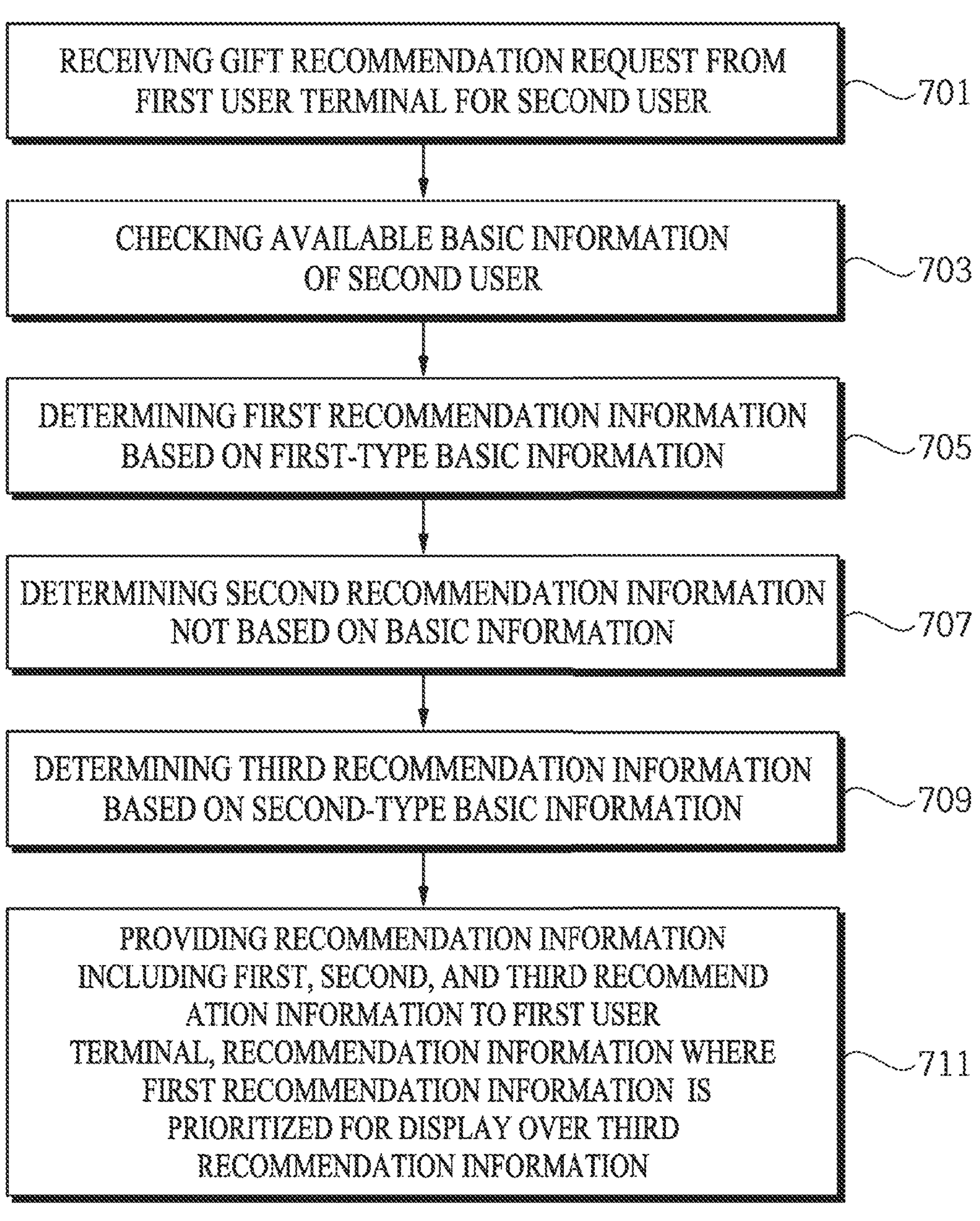
FIG. 7 is a flowchart to explain how a server of the present disclosure provides recommendation information that further includes a third recommendation information.

FIG. 7 is a flowchart for explaining a method by which the server 10 of the present disclosure provides recommendation information including a third recommendation information.

Operations 701, 703, and 707 of FIG. 7 are the same as operations 201, 203, and 207 of FIG. 2, so detailed descriptions thereof are substituted with the description of FIG. 2.

Operation 711 of FIG. 7 corresponds to operation 209 of FIG. 2, and any redundant description is substituted with the description of FIG. 2.

In operation 705, the server 10 determines a first recommendation information based on first-type basic information.

The server 10 may determine the first recommendation information based on the first-type basic information, which requires permission from the second user to use. Here, the first-type basic information refers to information among the basic information that is available only if the server 10 has obtained separate permission from a recipient for the gift recommendation function.

The server 10 may determine different recommendations reason based on whether the use of the first-type basic information is allowed by the second user terminal 30.

For example, the server 10 may check a permission setting for product viewing information by the second user terminal 30. In this case, the server 10 may determine a recommendation reason related to the second user's product viewing information.

In operation 709, the server 10 determines a third recommendation information based on second-type basic information.

The server 10 may determine the third recommendation information based on the second-type basic information, which does not require the second user's permission to use the basic information. Here, the second-type basic information refers to information that the server 10 can use for the gift recommendation function without obtaining separate permission from a recipient. The second-type basic information may include a wishlist and information on any gift exchanged with the first user.

In one embodiment, the third recommendation information includes a recommendation reason based on the second-type basic information and information on a recommended product related to the recommendation reason. The third recommendation information may include a third recommendation reason, information on at least one product related to the third recommendation reason, price information of the product, information about the product's reviews, and information about a recipient.

In operation 711, the server 10 provides the recommendation information including the first, second, and third recommendation information to the first user terminal.

Upon receiving an interaction with a gift recommendation interface from the first user terminal 20, the server 10 may provide gift recommendation information to the first user terminal 20. The gift recommendation information may include the first recommendation information based on the first-type basic information, the second recommendation information not based on the available basic information of the second user, and the third recommendation information based on the second-type basic information.

When providing the recommendation information, the server 10 may prioritize the first recommendation information over the third recommendation information.

Figure 8:
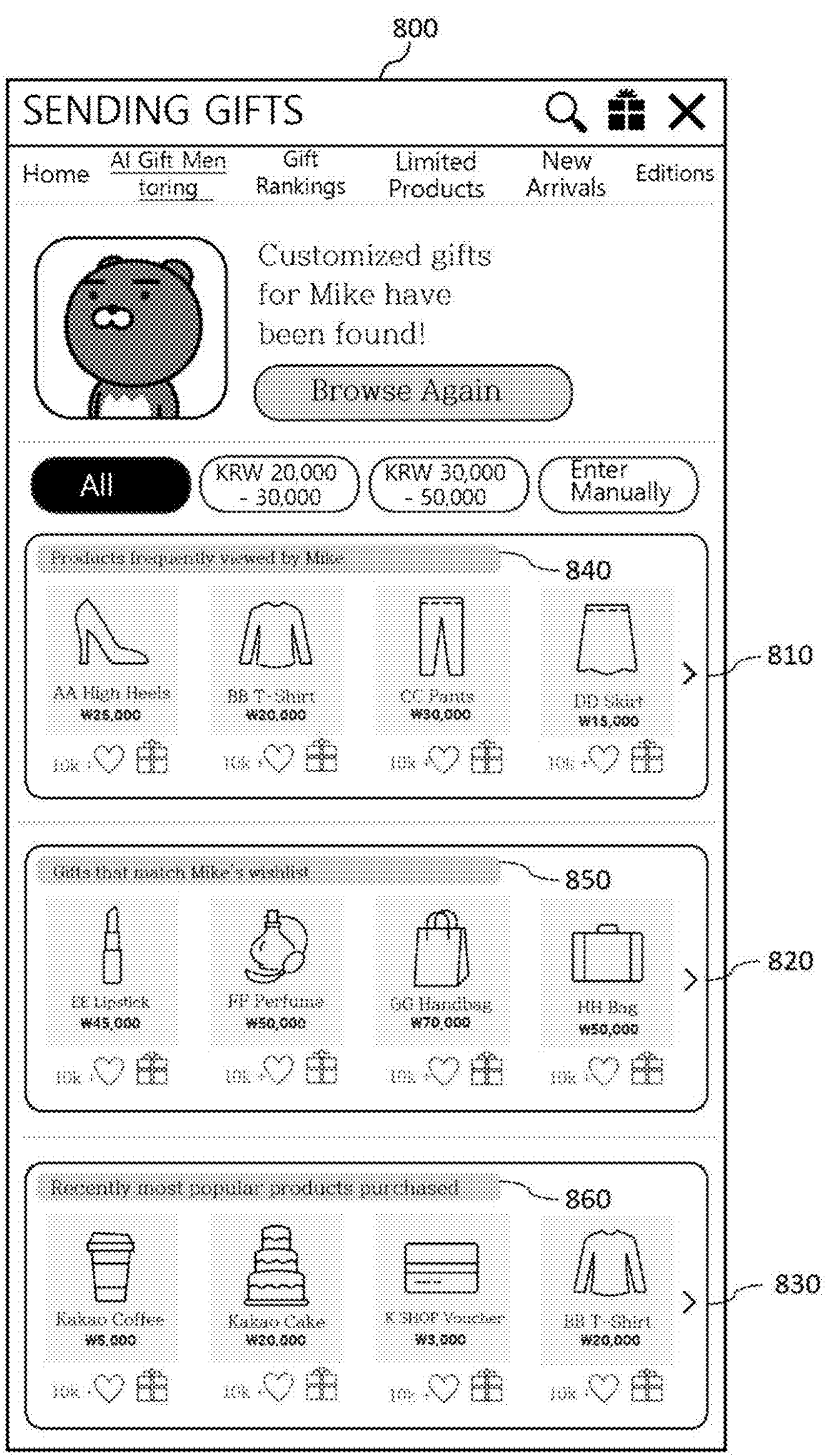
FIGS. 8 and 9 illustrate an exemplary process of a first user terminal performing a method of displaying first and third recommendation information, according to embodiments of the present disclosure.

FIG. 8 illustrates a screen where the first user terminal 20 displays recommendation information 800, including a first recommendation information 810, a second recommendation information 830, and a third recommendation information 820 in order for the server 10 to perform operations 705, 707, 709, and 711 of FIG. 7.

The first user terminal 20 may display the first recommendation information 810 within the recommendation information 800. In the first recommendation information 810, the first user terminal 20 may display a first recommendation reason 840 and at least one product 850 related to the first recommendation reason 840.

The first user terminal 20 may display the first recommendation information 810, the second recommendation information 830, and the third recommendation information 820 together. In this case, the first user terminal 20 may display the first recommendation information 810 above the third recommendation information 820.

For example, the first user terminal 20 may display the first recommendation information 810, which includes the first recommendation reason 840 (e.g., "Products frequently viewed by Mike"), above the third recommendation information 820, which includes the third recommendation reason 850 (e.g., "Gifts that match Mike's wishlist").

In addition, the first user terminal 20 may display the third recommendation information 820 above the second recommendation information 830. For example, the first user terminal 20 may display the third recommendation information 820, which includes the third recommendation reason 850 (e.g., "Gifts that match Mike's wishlist"), above the second recommendation information 830, which includes the second recommendation reason 860 (e.g., "Recently most popular products purchased").

When a plurality of recommendation information are provided in operation 711, the priorities for displaying the respective recommendation information may be determined based on the number of pieces of basic information on which each recommendation information is based.

Specifically, in FIG. 8, the first user terminal 20 may additionally display a fourth recommendation information (not shown) based on the basic information in addition to the first recommendation information 810. The server 10 may display a recommendation information between the first recommendation information and the fourth recommendation information, based on which is based on a greater number of pieces of basic information.

For example, if the first recommendation information 810 is based on one recommendation reason (e.g., frequently viewed products), but the fourth recommendation information is based on two recommendation reasons (e.g., gifts exchanged with other users, and the product's recommendation age that match the recipient's age), the server 10 may display the fourth recommendation information above the first recommendation information 810.

Figure 9:
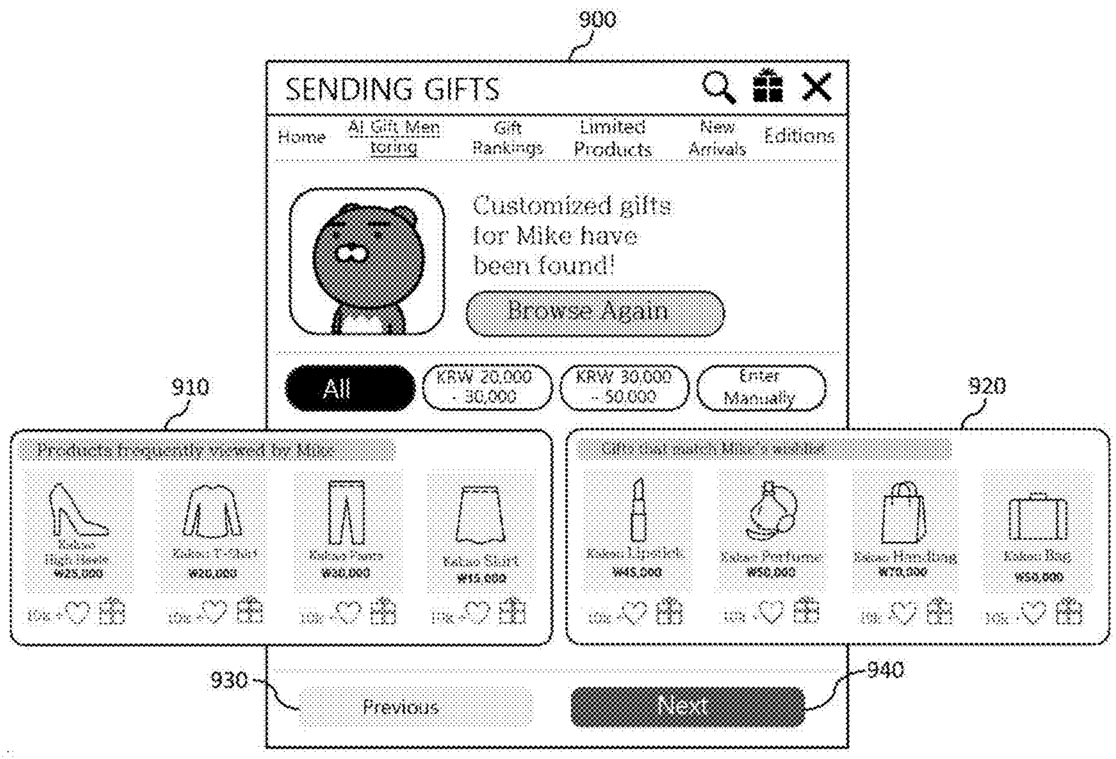

FIG. 9 illustrates a screen where the first user terminal 20 sequentially displays recommendation information 900, including a first recommendation information 910 and a third recommendation information 920, in order for the server 10 to perform operation 711 of FIG. 7.

Referring to FIG. 9, the first user terminal 20 may display the recommendation information 900.

The recommendation information 900 may include information about a recipient, a first recommendation information 910, and the third recommendation information 920. The first recommendation information 910 may include a first recommendation reason and at least one product related to the first recommendation reason. The third recommendation information 920 may include a third recommendation reason and at least one product related to the third recommendation reason.

The first user terminal 20 may display the first recommendation information 910 and the third recommendation information 920 sequentially. In this case, the first user terminal 20 may display the first recommendation information 910 before the third recommendation information 920.

For example, the first user terminal 20 may display the first recommendation information 910, which includes the first recommendation reason (e.g., "Products frequently viewed by Mike."), before the third recommendation information 920, which includes the third recommendation reason (e.g., "Gifts that match Mike's wishlist.").

In response to an interaction with Next interface 930 on the screen where the first recommendation information 910 is being displayed, the first user terminal 20 may display the third recommendation information 920. In addition, in response to a left drag interaction while the first recommendation information 910 is displayed, the first user terminal 20 may display the third recommendation information 920.

Conversely, in response to an interaction with Previous interface 940 on the screen where the third recommendation information 920 is being displayed, the first user terminal 20 may display the first recommendation information 910. In addition, in response to a right drag interaction while the third recommendation information 920 is displayed, the first user terminal 20 may display the first recommendation information 910.

Although not shown in the drawing, the first user terminal 20 may display the first recommendation information 910 before the third recommendation information 920 and the second recommendation information. In addition, the first user terminal 20 may display the third recommendation information 920 before the second recommendation information.

Figure 10:
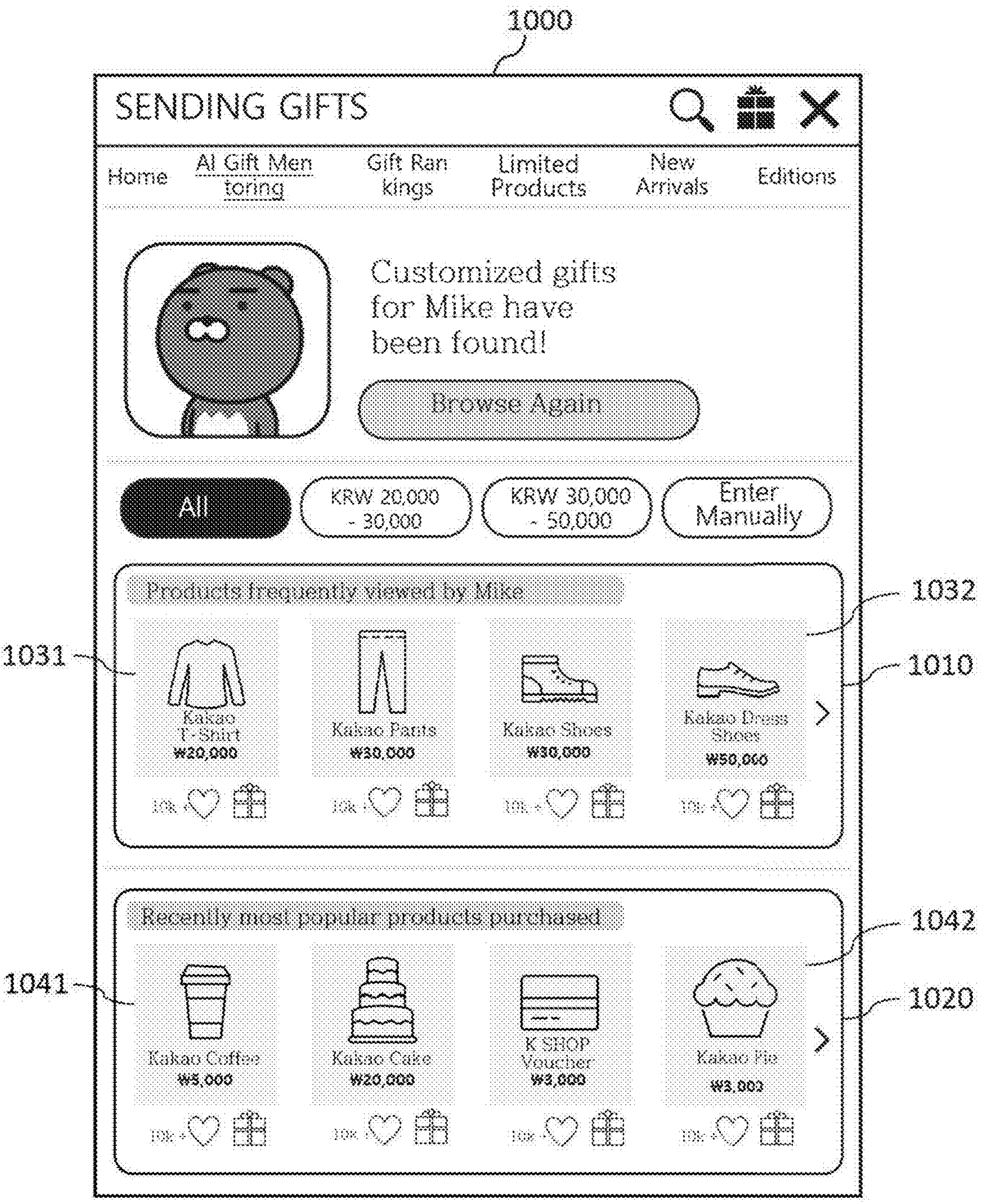
FIG. 10 illustrates an exemplary method for displaying a plurality of products in order of priority by a first user terminal.

FIG. 10 shows a screen where the first user terminal 20 displays a plurality of products 1031, 1032, 1041, and 1042 based on priorities when the plurality of products are included in the first and second recommendation information 1010 and 1020.

Referring to FIG. 10, the first user terminal 20 may display first and second recommendation information 1010 and 1020. The first and second recommendation information 1010 and 1020 may display the plurality of products 1031, 1032, 1041, and 1042 related to first and second recommendation reasons.

The server 10 may determine priorities for the plurality of products 1031, 1032, 1041, and 1042 based on basic information. The server 10 may provide the first user terminal 20 with first and second recommendation information including the plurality of products 1031, 1032, 1041, and 1042 based on priorities for the products 1031, 1032, 1041, and 1042.

For example, among a plurality of products based on the first recommendation reason (e.g., products viewed by the second user) in the first recommendation information 1010, if Kakao T-shirt 1031 has been viewed more recently or more frequently than Kakao Shoes 1032, Kakao T-shirt 1031 may be prioritized for display over Kakao Shoes 1032.

In addition, among a plurality of products based on the second recommendation reason (e.g., recently popular products) in the second recommendation information 1020, if Kakao Coffee 1041 has a higher popularity ranking than Kakao Pie 1042, Kakao Coffee 1041 may be prioritized for display over Kakao Pie 1042.

FIG. 11 is a flowchart to explain a method by which a user terminal of the present disclosure displays a gift recommendation function.

For convenience of explanation, similar or identical content to the aforementioned description of each operation of FIG. 11 will be omitted.

In operation 1101, the first user terminal 20 requests gift recommendations for a gift recipient from server 10. Since operation 1101 is substantially the same as operation 201 of FIG. 2, the detailed description of operation 1101 is substituted by the description of operation 201 of FIG. 2.

In operation 1103, the first user terminal 20 receives recommendation information for a gift recipient from the server 10 and displays the recommendation information. Within the recommendation information, the first recommendation information is prioritized for display over the second recommendation information. Since operation 1103 is substantially the same as operation 209, the detailed description of operation 1103 is substituted by the description of operation 209 of FIG. 2.

The method for product recommendation according to the present disclosure has the advantage of recommending not only popular gifts to a sender but also suggesting customized gifts that match a recipient's tastes by using the recipient's basic information.

The method for product recommendation according to the present disclosure has the advantage of allowing a recipient to directly decide whether to disclose the recipient's basic information, and recommending different gifts to the sender based on the recipient's decision on the disclosure of the basic information.

The technical features disclosed in each embodiment of the present disclosure are not limited to a corresponding embodiment, and unless incompatible with each other, the technical features disclosed in each embodiment may be applied in combination to other embodiments.

Therefore, although each embodiment is described mainly about an individual technical feature, the technical features of the embodiments of the present disclosure may be applied in combination, unless incompatible with each other.

The present disclosure is not limited to the above-described embodiments and the accompanying drawings, and various modifications and changes may be made in view of a person skilled in the art to which the present disclosure pertains. Therefore, the scope of the present disclosure should be determined by the scope of the appended claims, and equivalents thereof.

What is claimed is:

1. A method for product recommendation by a server comprising a memory storing instructions, a processor configured to execute the instructions, and a communication unit to communicate with user terminals over a network, the method comprising:

in response to an interaction with a gift recommendation interface rendered on a first user terminal, receiving, via the communication unit, a gift recommendation request, identifying a second user, from the first user terminal;

checking, by the processor, available basic information of the second user that is available for a gift recommendation function based on a permission status provided by a second user terminal, including limiting the checked basic information to content permitted for use with respect to a first user;

determining, by the processor, first recommendation information based on the basic information, wherein the first recommendation information comprises a first recommendation reason and at least one product related to the first recommendation reason, and wherein the first recommendation reason is determined conditioned on whether use of particular pieces of the basic information is allowed according to the permission status;

determining, by the processor, second recommendation information not based on the basic information, wherein the second recommendation information comprises a second recommendation reason and at least one product related to the second recommendation reason; and transmitting, via the communication unit, recommendation information including the first recommendation information and the second recommendation information to the first user terminal for display within a gift recommendation interface, wherein the first recommendation information is prioritized for display over the second recommendation information by causing the first recommendation information to be rendered ahead of the second recommendation information within the recommendation information displayed on the first user terminal, wherein each of the first recommendation information and the second recommendation information includes, for display within the gift recommendation interface, an associated recommendation reason together with the at least one product related to the associated recommendation reason, and wherein the first recommendation information and the second recommendation information are caused to be distinguishably displayed on the first user terminal, and the gift recommendation interface is configured to accept user input to select or navigate between the first recommendation information and the second recommendation information.

2. The method of claim 1, further comprising, prior to receiving the gift recommendation request, receiving information on a permission status for use of the basic information from the second user terminal.

3. The method of claim 2, wherein the permission status for use of the basic information is set differently depending on a sender comprising the first user.

4. The method of claim 1, wherein the basic information is set differently depending on a sender comprising the first user.

5. The method of claim 1, wherein the basic information comprises:

first-type basic information that requires permission from the second user to use; and second-type basic information that does not require permission from the second user to use.

6. The method of claim 5, wherein the first recommendation information is based on the first-type basic information, wherein the method further comprises, prior to providing the recommendation information, determining a third recommendation information based on the second-type basic information, the third recommendation information comprising a third recommendation reason and at least one product related to the third recommendation reason, wherein in providing the recommendation information, the recommendation information is provided with the third recommendation information included additionally, and wherein within the recommendation information, the first recommendation information is prioritized for display over the third recommendation information.

7. The method of claim 5, wherein the first-type basic information comprises at least one of the following: the second user's gender information, age information, birthday information, region information, purchase history information, product viewing information, and information on any gift exchanged with users other than the first user.

8. The method of claim 5, wherein the second-type basic information comprises at least one of a wishlist set by the second user and information on any gift exchanged between the first user and the second user.

9. The method of claim 1, wherein priorities for displaying individual recommendation information within the recommendation information are determined based on a number of pieces of basic information on which each of the respective individual recommendation information is based.

10. The method of claim 1, wherein the second recommendation reason is related to at least one of the following: sales information about a product, evaluation information about the product, weather information related to the product, or occasion information related to the product.

11. The method of claim 1, wherein, when the first and second recommendation information are displayed together within the recommendation, the first recommendation information is displayed above the second recommendation information.

12. The method of claim 1, wherein when the first and second recommendation information are displayed sequentially within the recommendation information, the first recommendation information is displayed before the second recommendation information.

13. The method of claim 1, wherein, when there are a plurality of second users, the basic information comprises all available basic information of the plurality of second users.

14. The method of claim 1, wherein, when there are a plurality of second users, the basic information comprises only content that is common among information which each of the plurality of second users has allowed to be used.

15. The method of claim 1, further comprising determining priorities for a plurality of products based on the basic information when the plurality of products are included in any one of the first and second recommendation information, wherein, within the recommendation information, the plurality of products are displayed based on the priorities.

16. The method of claim 1, wherein the second user comprises a plurality of second users, and wherein checking the basic information for the plurality of second users comprises categorizing non-identical values into common categories and including, as the basic information, only categories that are common across the plurality of second users.

17. The method of claim 1, wherein priorities among a plurality of products within the first recommendation information are determined based on at least one of recency or frequency of viewing by the second user, and priorities among a plurality of products within the second recommendation information are determined based on a popularity ranking.

18. A server for product recommendation, the server comprising:

a memory storing instructions, and a processor configured to execute the instructions to:

in response to an interaction with a gift recommendation interface rendered on a first user terminal, receive, via the communication unit, a gift recommendation request, identifying a second user, from the first user terminal;

check available basic information of the second user that is available for a gift recommendation function based on a permission status provided by a second user terminal, including limiting the checked basic information to content permitted for use with respect to a first user;

determine first recommendation information based on the basic information, wherein the first recommendation information comprises a first recommendation reason and at least one product related to the first recommendation reason, and wherein the first recommendation reason is determined conditioned on whether use of particular pieces of the basic information is allowed according to the permission status;

determine second recommendation information not based on the basic information, wherein the second recommendation information comprises a second recommendation reason and at least one product related to the second recommendation reason; and transmit recommendation information including the first recommendation information and the second recommendation information to the first user terminal for display within a gift recommendation interface, wherein the first recommendation information is prioritized for display over the second recommendation information by causing the first recommendation information to be rendered ahead of the second recommendation information within the recommendation information displayed on the first user terminal, wherein each of the first recommendation information and the second recommendation information includes, for display within the gift recommendation interface, an associated recommendation reason together with the at least one product related to the associated recommendation reason, and wherein the first recommendation information and the second recommendation information are caused to be distinguishably displayed on the first user terminal, and the gift recommendation interface is configured to accept user input to select or navigate between the first recommendation information and the second recommendation information.

19. A method for product recommendation by a user terminal, the method comprising:

requesting gift recommendations for a gift recipient from a server; and receiving recommendation information for the gift recipient from the server and displaying the recommendation information within a gift recommendation interface rendered on the user terminal, wherein the recommendation information comprises:

first recommendation information based on available basic information of the gift recipient, the first recommendation information comprising a first recommendation reason and at least one product related to the first recommendation reason; and second recommendation information not based on the available basic information, the second recommendation information comprising a second recommendation reason and at least one product related to the second recommendation reason, wherein each of the first recommendation information and the second recommendation information includes, for display within the gift recommendation interface, an associated recommendation reason together with the at least one product related to the associated recommendation reason, wherein, within the recommendation information, the first recommendation information is prioritized for display over the second recommendation information, by being rendered ahead of the second recommendation information on the user terminal, and wherein the first recommendation information and the second recommendation information are distinguishably displayed on the user terminal, and the gift recommendation interface is configured to accept user input to select or navigate between the first recommendation information and the second recommendation information.

* * * * *